United States Patent
Schmeisser et al.

(10) Patent No.: US 11,652,229 B2
(45) Date of Patent: May 16, 2023

(54) FUEL CELL STACK, METHOD FOR PRODUCING A FUEL CELL STACK AND METHOD FOR OPERATING A FUEL CELL STACK

(71) Applicant: Robert Bosch GmbH, Stuttgart (DE)

(72) Inventors: Harald Schmeisser, Stuttgart (DE); Ulrich Berner, Stuttgart (DE); Udo Riegler, Stuttgart (DE); Jochen Wessner, Esslingen (DE); Florian Alexander Knorr, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 235 days.

(21) Appl. No.: 17/264,910

(22) PCT Filed: Jul. 30, 2019

(86) PCT No.: PCT/EP2019/070456
§ 371 (c)(1),
(2) Date: Feb. 1, 2021

(87) PCT Pub. No.: WO2020/025597
PCT Pub. Date: Feb. 6, 2020

(65) Prior Publication Data
US 2021/0305615 A1    Sep. 30, 2021

(51) Int. Cl.
*H01M 8/248* (2016.01)
*H01M 8/2404* (2016.01)
(Continued)

(52) U.S. Cl.
CPC ....... *H01M 8/248* (2013.01); *H01M 8/04029* (2013.01); *H01M 8/0444* (2013.01);
(Continued)

(58) Field of Classification Search
None
See application file for complete search history.

(56) References Cited

U.S. PATENT DOCUMENTS

| 4,692,391 | A | * | 9/1987 | Hirota | H01M 8/247 |
|---|---|---|---|---|---|
| | | | | | 429/471 |
| 8,679,693 | B2 | | 3/2014 | Oriol | |

(Continued)

FOREIGN PATENT DOCUMENTS

| EP | 1519436 A1 | 3/2005 |
|---|---|---|
| EP | 3331078 A1 | 6/2018 |

(Continued)

OTHER PUBLICATIONS

Translation of the International Search Report for Application No. PCT/EP2019/070456 dated Mar. 16, 2020 (4 pages).

*Primary Examiner* — Haroon S. Sheikh
(74) *Attorney, Agent, or Firm* — Michael Best & Friedrich LLP (57) ABSTRACT

The present invention relates to a fuel cell stack (10) and to a method for producing such a fuel cell stack (10). The fuel cell stack (10) comprises at least two fuel cell modules (58) with in each case at least two individual cells (5), each fuel cell module (58) having module end plates (70) on both cell stack outer sides (66), and fuel cell stack compression means (82), via which the fuel cell modules (58) stacked one on top of the other are braced to form a fuel cell stack (10).

16 Claims, 7 Drawing Sheets

(51) Int. Cl.
  *H01M 8/04029* (2016.01)
  *H01M 8/0444* (2016.01)
  *H01M 8/04664* (2016.01)
  *H01M 8/04858* (2016.01)
  *H01M 8/249* (2016.01)

(52) U.S. Cl.
  CPC ..... *H01M 8/0488* (2013.01); *H01M 8/04671* (2013.01); *H01M 8/2404* (2016.02); *H01M 8/249* (2013.01); *H01M 2250/20* (2013.01)

(56) References Cited

U.S. PATENT DOCUMENTS

| | | | | |
|---|---|---|---|---|
| 8,691,454 | B1* | 4/2014 | Czajkowski | ...... H01M 8/04947 |
| | | | | 702/65 |
| 2002/0068212 | A1* | 6/2002 | Osenar | ................. H01M 8/241 |
| | | | | 429/434 |
| 2004/0046526 | A1* | 3/2004 | Richards | ............... H01M 8/248 |
| | | | | 320/101 |
| 2004/0096724 | A1* | 5/2004 | Debe | ..................... H01M 8/248 |
| | | | | 429/469 |
| 2005/0221149 | A1 | 10/2005 | Matsubayashi et al. | |
| 2011/0269042 | A1 | 11/2011 | Schneider et al. | |
| 2013/0089804 | A1* | 4/2013 | Park | ................... H01M 8/2432 |
| | | | | 429/465 |

FOREIGN PATENT DOCUMENTS

| | | |
|---|---|---|
| JP | H01281681 A | 11/1989 |
| JP | H0562702 A | 3/1993 |
| JP | H10241719 A | 9/1998 |
| JP | 2005183358 A | 7/2005 |
| JP | 2007273113 A | 10/2007 |
| JP | 2009086043 A | 10/2010 |
| JP | 2016062852 A | 4/2016 |
| KR | 20050045070 A | 5/2005 |
| WO | 2011095815 A1 | 8/2011 |
| WO | 2016205139 A1 | 12/2016 |

* cited by examiner

FUEL CELL STACK, METHOD FOR PRODUCING A FUEL CELL STACK AND METHOD FOR OPERATING A FUEL CELL STACK

BACKGROUND OF THE INVENTION

The present invention relates to a fuel cell stack, a method for producing a fuel cell stack and a method for operating a fuel cell stack.

In fuel cell systems, the oxidizing agent—oxygen from the ambient air—is generally used to react with hydrogen in the fuel cell to produce water and therefore to provide electrical power through electrochemical conversion.

From EP 2 869 376 A1, it is known to form a fuel cell stack which is assembled by layering a plurality of fuel cell modules formed in advance by layering a multiplicity of fuel cell unit cells or individual cells.

A background of the invention consists in that, in the case of a fuel cell stack, the greatest risk of a defect during the manufacture of the stack comes from the sealing points in the cell. Although each individual cell itself has good reliability in terms of the sealing points, the overall risk of defects with a total of several 1000 sealing points per stack increases considerably so that, after completion of the fuel cell stack, a relatively high reject rate of defective fuel cell stacks in the region of 10% can nonetheless arise. The high reject rate of defective fuel cell stacks therefore increases the price of the defect-free fuel cell stack. Furthermore, the leak-tightness or hydrogen leakage during operation can be better monitored as a result of the design having fuel cell modules.

SUMMARY OF THE INVENTION

An aspect of the invention consists in that, in advantageous configurations and applications of the fuel cell stack in a modular design, the individual cells can be operated with voltages which result in comparatively little degradation and the individual cells of the different fuel cell modules can even be configured to be optimized differently, for example in terms of optimized catalyst loadings.

The object of the present invention is therefore to provide a fuel cell stack, a method for producing such a fuel cell stack with which a reject rate of defective fuel cell stacks is reduced so that economical production of fuel cell stacks is possible, and therefore, furthermore, a fuel cell stack which has optimized individual cells, reduced degradation and an increased lifespan. A method for operating such a fuel cell stack shall furthermore be provided, with which reduced degradation and an increased lifespan can be achieved.

The object is achieved by a fuel cell stack, a method for producing such a fuel cell stack and a method for operating such a fuel cell stack according to the invention. The dependent claims in each case present advantageous developments of the invention.

In this case, the inventive fuel cell stack comprises at least two fuel cell modules having at least two individual cells in each case, wherein each fuel cell module has module end plates on both cell stack outer sides, and fuel cell stack compression means via which the stacked fuel cell modules are braced to form a fuel cell stack.

The present invention relates to a fuel cell stack (10) and a method for producing such a fuel cell stack (10). In this case, the fuel cell stack (10) comprises at least two fuel cell modules (58) having at least two individual cells (5) in each case, wherein each fuel cell module (58) has module end plates (70) on both cell stack outer sides (66), and fuel cell stack compression means (82) via which the stacked fuel cell modules (58) are braced to form a fuel cell stack (10).

Within the context of the invention, individual cells here refer to the customary arrangement of the gas diffusion layers with the catalytically coated membrane between a cathode bipolar plate and an anode bipolar plate. The cell stack outer side here is the free side of the cathode bipolar plate or anode bipolar plate of the cell stack, which lies orthogonally to a fuel flow direction on the cell stack. The module stack outer sides are accordingly the free sides of the module stack which extend in the same plane. In this case, the fuel cell stack compression means is a means which is preferably mechanically connected to two stack end plates so that the entire module stack can be braced between them.

The inventive structure of the fuel cell stack has the advantage that each fuel cell module can be checked via the module end plates prior to stacking, in particular for media-tightness. Checking is therefore enabled not only after the assembly of all cells on the complete fuel cell stack. The only rejects are therefore the individual cells stacked in the fuel cell module which is shown to be defective in each case. The costs related to the rejects are therefore considerably reduced. In addition, the likelihood of failure of the fully assembled fuel cell stack is considerably reduced. The economic efficiency in the production of such fuel cell stacks is thus considerably increased.

In a preferred embodiment of the invention, the fuel cell stack has module compression means via which the individual cells of each fuel cell module are braced between the module end plates. Within the context of the invention, module compression means in this case refer to a means which is preferably mechanically connected to both module end plates so that the entire cell stack can be braced between them. It is thus prevented that the stacked individual cells shift with respect to one another, which means that a further possible defect source is therefore avoided. The likelihood of failure of the fuel cell stack is thus further reduced.

In a further preferred embodiment of the invention, the module compression means are tensioning bands. Good bracing of the fuel cell module can be achieved by tensioning bands. In this case, five to eight tensioning bands are particularly advantageously used for each fuel cell module.

In an advantageous configuration of the invention, the module end plates are made of metal. In this case, this metal particularly preferably has good electrical conductivity. Metals are advantageous in that they generally have good mechanical stability, which means that the module end plates can be designed to be correspondingly thinner. Moreover, metal is highly available and has good processability.

The module end plates are alternatively made of graphite. Graphite is advantageous in that it is electrically conductive and has low material costs. In addition, graphite has a relatively low weight so that, by providing module end plates made of graphite, the total weight of such a fuel cell stack is only slightly higher than that of conventionally produced fuel cell stacks.

In another alternative, the module end plates are produced from electrically conductive plastic material. Plastic materials are advantageous in that they are available in bulk and in varying quantities. Moreover, plastic materials are low cost and can be easily processed in an injection molding procedure, for example. The fuel cell stacks can therefore be produced more economically. Moreover, plastic materials have a relatively low weight so that, by providing module end plates made of plastic material, the total weight of such a fuel cell stack is only slightly higher than that of conventionally produced fuel cell stacks.

In a further alternative, the module end plates are produced from the same material as a bipolar plate of the individual cell. The number of materials required for producing a stack can therefore be reduced. The storage of such materials is therefore no longer required, which means that the stack can be produced more economically.

The module end plates preferably have a thickness of 5 mm-15 mm. Within the context of the invention, thickness here refers to the thickness or extent of the module end plates in the stacking direction. In this range, sufficient stability of the module end plates can be guaranteed. The thickness of the module end plates is particularly preferably in the range of 5 mm-20 mm.

The fuel cell stack is advantageously composed of 80 to 450 individual cells depending on the power. A particularly preferred embodiment of the fuel cell stack comprises six to twelve fuel cell modules having preferably 20 to 50 individual cells in each case. In this case, the number of individual cells for the individual fuel cell modules can also be different. Such a fuel cell stack is advantageous in that sufficient power is available. In addition, such a fuel cell stack can be used for most applications. The fuel cell stack is particularly preferably composed of 420 to 450 individual cells. High power can be provided with such a fuel cell stack.

In advantageous developments, the module compression means, in particular when designed as tensioning bands, are electrically insulated only in the region of the lateral contact surfaces of the individual cells. The volume of electrical insulating material is thus reduced, whereby the material costs are lowered.

In preferred embodiments, each fuel cell module has a separate power connection, which is preferably arranged on a module end plate. The fuel cell modules can therefore be individually shorted during shutdown, or individually connected to a consumer (for example a battery) during operation. This embodiment can then also be used for advantageous operating procedures of the fuel cell stack.

Each fuel cell module advantageously has a separate voltage control. The voltage controls of the individual fuel cell modules can therefore be arranged independently of one another.

Each fuel cell module preferably has a separate hydrogen sensor. Early and robust detection of a possible internal leakage of hydrogen in the interior of the fuel cell stack is thus achieved.

In preferred further developments, one or more module end plates have a cooling distribution field. As a result of incorporating the comparatively thick module end plates in the cooling circuit, the cooling of the fuel cell modules is implemented very effectively.

One or more module end plates particularly preferably have closable port feedthroughs. The media supply to the fuel cell module or to the next fuel cell module can thus be interrupted or stopped. This is advantageous in particular if, for low-load ranges, not all fuel cell modules are connected to the consumer.

In advantageous embodiments, individual fuel cell modules can be disconnected from an electric circuit of the fuel cell stack by means of electrical switches. These fuel cell modules are thus no longer connected to the consumer, which is a preferred embodiment for low-load ranges, in particular in combination with the closable port openings.

The invention therefore also relates to a corresponding method for operating the fuel cell stack in the low-load range.

In preferred further developments, the individual cells of the fuel cell modules which can be disconnected from the electric circuit have a modified design, for example a comparatively low catalyst loading. These individual cells are then only connected to the consumer during peak loads.

The invention additionally comprises a method for producing a fuel cell stack, in particular the inventive fuel cell stack. In this case the method comprises the steps of stacking at least two individual cells of the fuel cell stack, arranging module end plates on both cell stack outer sides of the stacked individual cells, bracing the individual cells between the module end plates by means of a module compression means to form a fuel cell module, checking the fuel cell module for absence of defects and/or for leak-tightness, stacking at least two fuel cell modules produced in such a way, and bracing the stacked fuel cell modules by means of a fuel cell stack compression means. In this case, the fuel cell modules can be arranged between stack end plates.

The method for producing a fuel cell stack has the same advantages as the fuel cell stack described above. In particular, using the method, the fuel cell modules can be checked for absence of defects, in particular also for leak-tightness, prior to stacking. Furthermore, the fuel cell modules can also be conditioned individually. In this case, conditioning refers primarily to moistening the membrane after the assembly of the fuel cell module, but also activating the catalyst. It is also particularly advantageous here to already carry this out for the individual fuel cell modules—i.e. prior to stacking—since the conditioning can be potentially defective, which means that, in an unfavorable case resulting from defective conditioning, only one fuel cell module has to be replaced and not the entire fuel cell stack.

In a preferred exemplary embodiment of the method, the module compression means are removed after the bracing of the stacked fuel cell modules. The weight of the module compression means can thus be reduced; also, the module compression means consequently do not need to be configured for the lifespan of the fuel cell stack.

The invention additionally comprises a method for operating a fuel cell stack, in particular the inventive fuel cell stack, in a low-load range, wherein the method comprises the following steps:
   disconnecting a fuel cell module from a gas supply, in particular by means of the closable port feedthroughs;
   disconnecting the same fuel cell module from the electric circuit by means of at least one switch.

For the low-load range, one or more fuel cell modules are therefore disconnected from the supply of reducing agent (preferably hydrogen) and oxidizing agent (preferably oxygen), and electrically from the consumer. The—non-disconnected—individual cells remaining in the electric circuit can therefore be operated in the optimal voltage range. In advantageous embodiments, the designs of the individual cells are adapted accordingly; for example, the catalyst loadings of the individual cells which are not in operation in the low-load range can be reduced.

The invention additionally comprises a motor vehicle having the inventive fuel cell stack. In this case, the motor vehicle has the same advantages as those mentioned with regard to the fuel cell stack. In addition, the failure of such a motor vehicle as a result of a subsequent failure of the fuel cell stack is reduced.

BRIEF DESCRIPTION OF THE DRAWINGS

Exemplary embodiments of the invention are illustrated in the drawing and explained in more detail in the description below.

DETAILED DESCRIPTION

Figure 1:
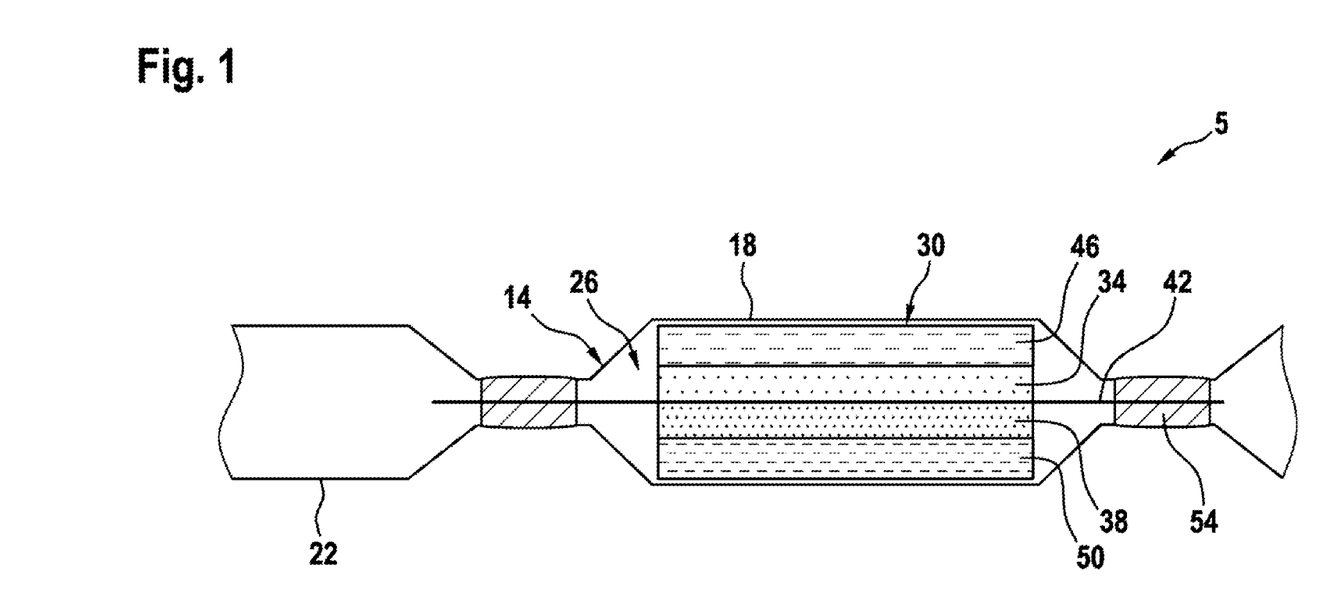
FIG. 1 shows a sectional view of an exemplary embodiment of an individual cell of the inventive fuel cell stack, wherein only the essential regions are shown.
Figure 2:
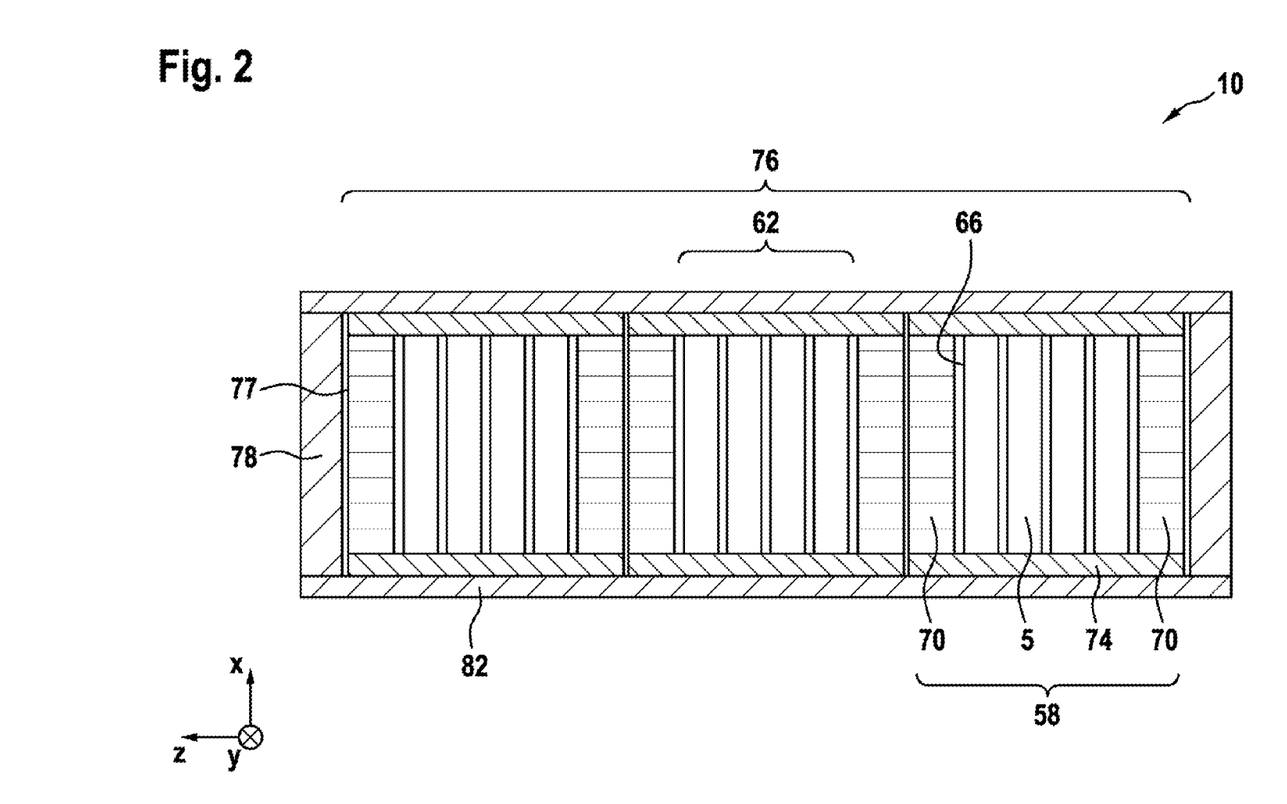
FIG. 2 shows a sectional view of a first exemplary embodiment of the inventive fuel cell stack, wherein only the essential regions are shown.
Figure 3:
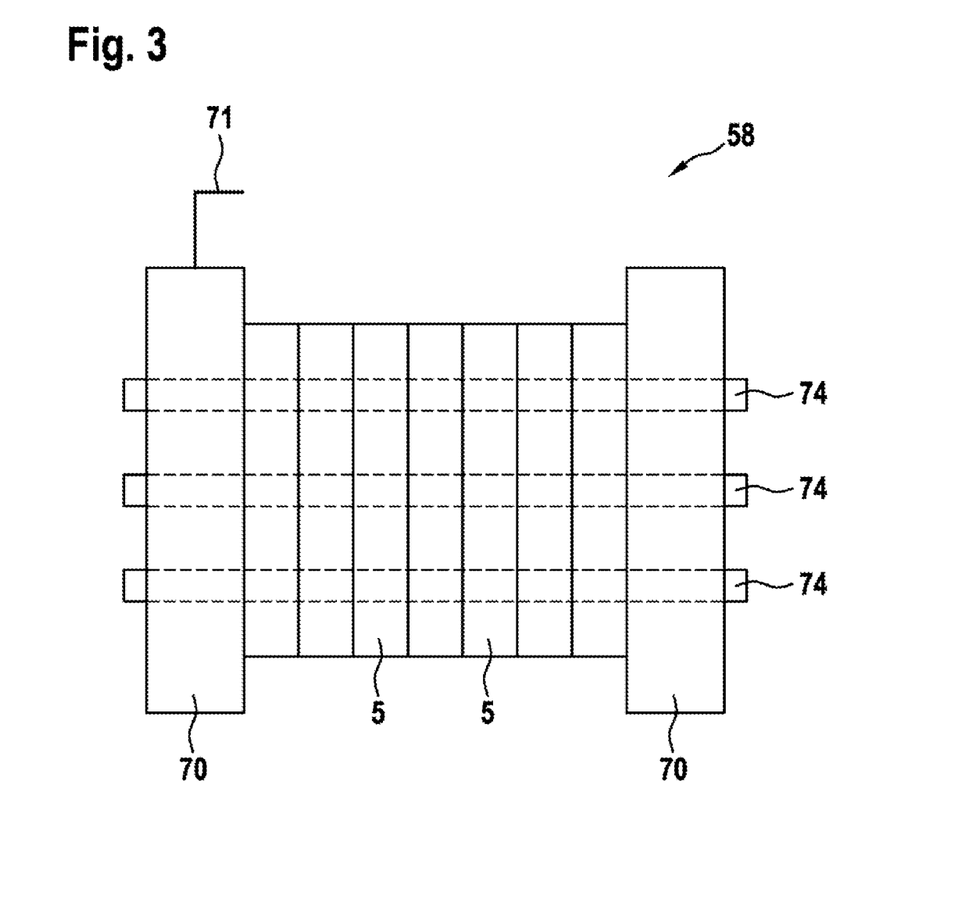
FIG. 3 shows a side view of a fuel cell module of the inventive fuel cell stack, wherein only the essential regions are shown.

FIG. 1 shows a sectional view of an exemplary embodiment of an individual cell 5 of an inventive fuel cell stack 10 (see FIGS. 2 and 3). The individual cell 5 is formed from a cathode bipolar plate 18 having a bead 14. An anode bipolar plate 22 is arranged in a mirror-inverted manner with respect to the cathode bipolar plate 18 so that the beads 14 of both bipolar plates 18, 22 are opposite one another. Channels 26 are thus formed between the cathode bipolar plate 18 and the anode bipolar plate 22. A layered structure 30 is arranged within the channels 26. This layered structure 30 is shown by way of example in a channel 26. In this case, the layered structure 30 is composed of a first and a second gas diffusion layer 34, 38, which are separated by a membrane 42. The oxygen 46 which is required for the oxidation flows between the first gas diffusion layer 34 and the cathode bipolar plate 18. The hydrogen 50, which is preferably used as fuel, flows between the second gas diffusion layer 38 and the anode bipolar plate 22.

The anode bipolar plate 22 of an individual cell 5 is conventionally assembled with the cathode bipolar plate 18 of the adjacent individual cell 5 to form a bipolar plate.

At the points at which the beads 14 of the cathode bipolar plate 18 and the anode bipolar plate 22 are opposite one another, sealing material 54 is provided between the membrane 42 and the bipolar plates 18, 22. Most defects occur at these points, as already described above.

A sectional view of a first exemplary embodiment of the inventive fuel cell stack 10 is shown in FIG. 2. By way of example, in this exemplary embodiment, three fuel cell modules 58 are shown stacked. In this case, each fuel cell module 58 comprises a number of individual cells 5, illustrated by way of example here as four individual cells. In this case, each individual cell 5 is constructed according to FIG. 1. These individual cells 5 are stacked and module end plates 70 are arranged on cell stack outer sides 66 of the cell stack 62 formed in this way. The stacked individual cells 5 are braced together via module compression means 74, which are mechanically connected to the two module end plates 70.

A preferred embodiment of the fuel cell stack 10 comprises six to twelve fuel cell modules 58 having preferably 20 to 50 individual cells 5 in each case. In this case, the number of individual cells 5 can also be different for the individual fuel cell modules 58.

The fuel cell modules 58 formed in this way are stacked with the module end plates 80 such that they abut against one another. In the module stack 76 formed in this way, stack end plates 78 are arranged on the last module end plate 70 on the two module stack outer sides 77. The stacked fuel cell modules 58 are braced to form a fuel cell stack 10 via fuel cell stack compression means 82, which are mechanically connected to the stack end plates 78.

Each fuel cell module 58 can therefore be checked for absence of defects prior to being incorporated in the module stack 76. There is therefore no need to delay checking until the production of the fuel cell stack 10 is complete. These fuel cell modules 58 can be constructed on a special device in an individual pre-assembly step and aligned with considerably greater positional accuracy (in terms of a precise alignment of all individual cells 5 in the stack direction). The force transmission in the stack direction between adjacent bipolar plates 18, 22 and the membrane-electrode units lying between them (which are composed of the membrane 42, an anode-side electrode, a cathode-side electrode and the two gas diffusion layers 34, 38) will therefore take place much more precisely than with a conventional assembly of all cell components, in which all bipolar plates 18, 22 and membrane-electrode units of the entire fuel cell stack 10 are stacked in an alternating manner.

Partial squashing of the edge regions of the membrane-electrode units at the transition to the bipolar plate 18, 22 is substantially prevented. As a result of the more precise positioning of the bipolar plates 18, 22 with respect to one another, more precise positioning of the membrane-electrode units with respect to each of the bipolar plates 18, 22 is also possible using automated means (tolerance reduction during the automated placement of the membrane-electrode units using robots). The individual cells 5 of a fuel cell module 58 are preferably compressed to a desired target value (for example, path-controlled, by 60 μm/individual cell or, force-controlled, at 15 bar). Each fuel cell module 58 is subsequently provisionally secured by means of the module compression means 74, preferably by means of metal tensioning bands, alternatively by means of tensioning bands made from an extremely loadable plastic material. A comparatively small stack, i.e. a fuel cell module 58, is thus produced, which can be independently checked for leak-tightness and subsequently pre-conditioned.

FIG. 3 shows a side view of a fuel cell module 58 having a multiplicity of individual cells 5, which are braced between two module end plates 70 by means of three module compression means 74. In this case, the module compression means 74 are designed as tensioning bands. In preferred embodiments, a fuel cell module 58, which comprises individual cells 5 with an area of approximately 200×300 mm², has eight tensioning bands which are each ca. 300 mm wide.

The tensioning bands 74 are preferably only insulated in the region of the lateral contact surfaces of the individual cells 5 in order to prevent a short circuit between the bipolar plates.

One of the two module plates 70 of the fuel cell module 58 advantageously has a power connection 71. Each of the fuel cell modules 58 therefore has a separate, switchable electrical contact for tapping the voltage so that, via the switchable contacts, each of the fuel cell modules 58 or a defined/desired number of fuel cell modules 58 outputs its contribution (of ca. 0.6 V to 1 V per individual cell 5) to the external electric circuit.

Each of the battery cell modules 58 preferably has a separate voltage control to enable early identification of defective individual cells 5. Ideally, the voltage control likewise takes place by means of the power connection 71. As a result of the modular design having a plurality of fuel cell modules 58, individual fuel cell modules 58 can be very easily replaced in the event of a defect—or if there is a lack of leak-tightness. It is thus possible to save considerably on costs since it is not necessary to disassemble each of the individual cells 5 in the entire fuel cell stack 10, or even replace the entire fuel cell stack 10, due to only one defective individual cell 5. Reducing the checking effort when searching for a defective individual cell 5 and the subsequent work required in the event of a defect reduces the assembly effort for the fuel cell stack 10.

Each fuel cell module 58 furthermore preferably has a separate hydrogen sensor. Internal leakages of the fuel cell module 58 can thus be detected early; such leakages can occur due to damage in the membrane 42, for example, and can lead to premature failure of the fuel cell module 58 or the fuel cell stack 10.

When a hydrogen sensor is assigned to each fuel cell module 50, a better spatial resolution and localization of the cause of the leakage is possible compared to when only one hydrogen sensor is provided for the entire fuel cell stack 10. A hydrogen sensor which is not mounted near enough to the site of the increased hydrogen concentration will moreover only be able to determine a mean signal over many individual cells 5. There is a comparatively narrow path between the signal detection lower limit at preferably ~0.5% hydrogen content and the flammability limit of the hydrogen in air at ca. 4% (at local level). Early or prompt and robust detection of the internal leakage of hydrogen in the interior of the fuel cell stack 10 can be achieved by assigning a hydrogen sensor to each individual fuel cell module 58.

Figure 4:
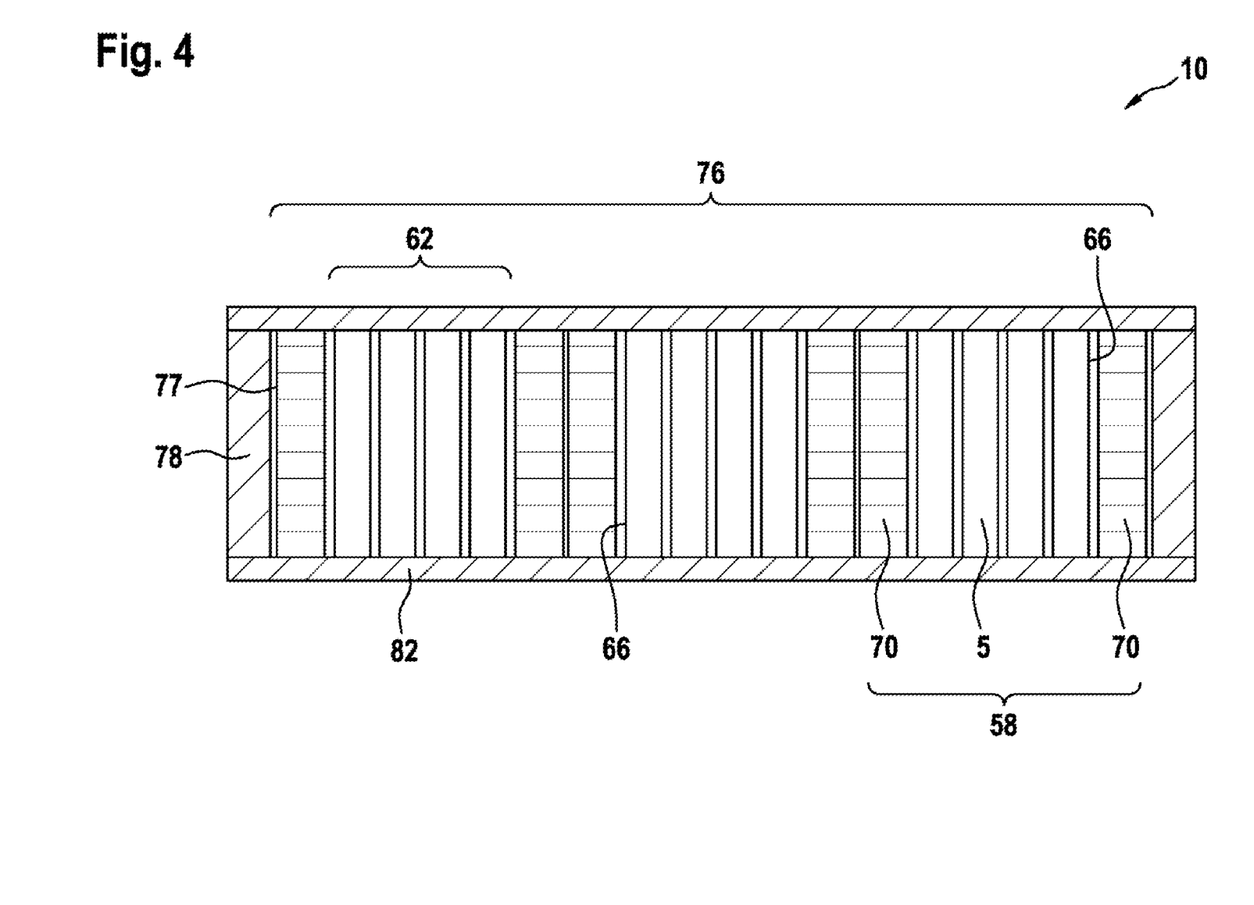
FIG. 4 shows a side view of a further exemplary embodiment of the inventive fuel cell stack, wherein only the essential regions are shown.

A sectional view of a further exemplary embodiment of the inventive fuel cell stack 10 is shown in FIG. 4. This fuel cell stack 10 differs substantially from the fuel cell stack 10 of FIGS. 2 and 3 in that module compression means 74 are not present in this fuel cell stack 10. In this exemplary embodiment, the module compression means 74 are removed after the bracing of the stacked fuel cell modules 58.

By dividing the fuel cell stack 10 into a plurality of fuel cell modules 58, it is ensured that the positional accuracy during the final assembly of the fuel cell modules 58 is principally defined by positioning errors of these stacked fuel cell modules 58 with respect to one another, and the adjustment during the final assembly, via an appropriate displacement of the topmost fuel cell module 58 in each case, can take place much more easily than when too high a number of individual cells 5 are stacked. The same applies to the leak-tightness of the fuel cell stack 10: this is essentially determined by the stacked module end plates 70 since their leak-tightness could not already be checked, whereas the leak-tightness of the individual fuel cell modules 58 themselves can be checked prior to the final assembly and then possibly also subsequently improved.

At the same time, by assembling and checking the fuel cell modules 58, an altogether reduced checking effort for the entire fuel cell stack 10 is achieved, resulting in a reduced risk of failure of the finished fuel cell stack 10 in the final check. A cost advantage for the fuel cell stack 10 is achieved overall. Therefore, fuel cell modules 58 which are conspicuous during checking can be easily replaced with other fuel cell modules and also combined for specific investigations (e.g. behavior with different platinum loadings or at the end of the expected lifespan of the fuel cell stack 10). In a final assembly step, all fuel cell modules 58 are compressed together to the target value and the module compression means 74 of the individual fuel cell modules 58 used for pre-securing purposes are cut through and removed from the fuel cell stack 10. To this end, the module end plates 70 have preferably suitable openings (approximately 0.5 mm thick).

Figure 5:
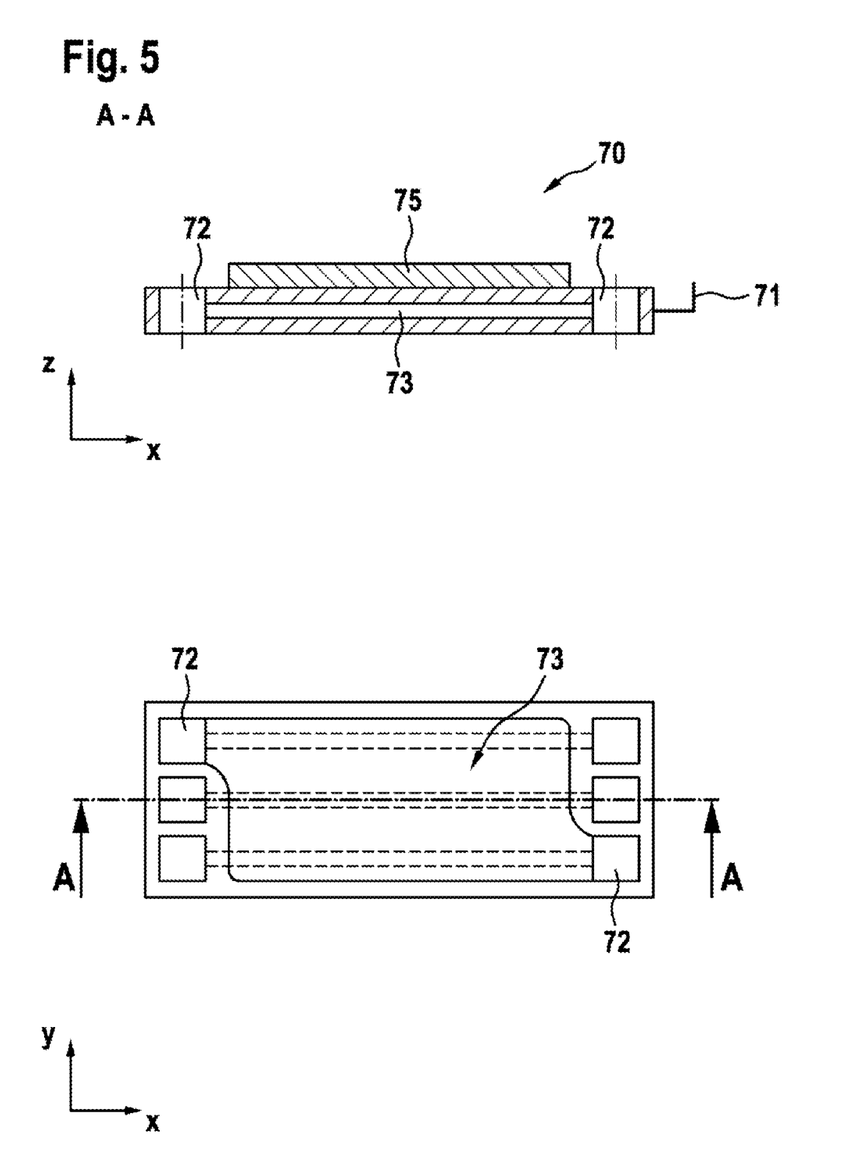
FIG. 5 shows an exemplary embodiment of a module end plate in cross-section and in plan view, wherein only the essential regions are shown.

FIG. 5 shows an advantageous embodiment of a module end plate 70 in cross-section and in plan view. The module end plate 70 has—similar to the bipolar plates 18, 22—port feedthroughs 72 for supplying media to the fuel cell modules 58 or to the individual cells 5. In preferred embodiments, one or more module end plates 70 of the fuel cell stack 10 have a cooling distribution field 73, which branches off from the port feedthrough 72 for cooling medium and extends over the surface x-y (in-plane, analogously to the active surface of the individual cells 5).

The module end plate 70 thus has integrated cooling water channels of the cooling distribution field 73. The incorporation of such module end plates 70 in the cooling circuit is a preferred exemplary embodiment.

Optionally, the module end plate 70 can preferably contain a flexible tolerance compensating element 75. In the embodiment of FIG. 5, this is configured in the form of a plate and arranged on one of the two x-y surfaces of the module end plate 70. The tolerance compensating element 75 can effectively improve the bracing precision of the fuel cell modules 58 with respect to one another and homogenize the surface pressure.

Figure 6:
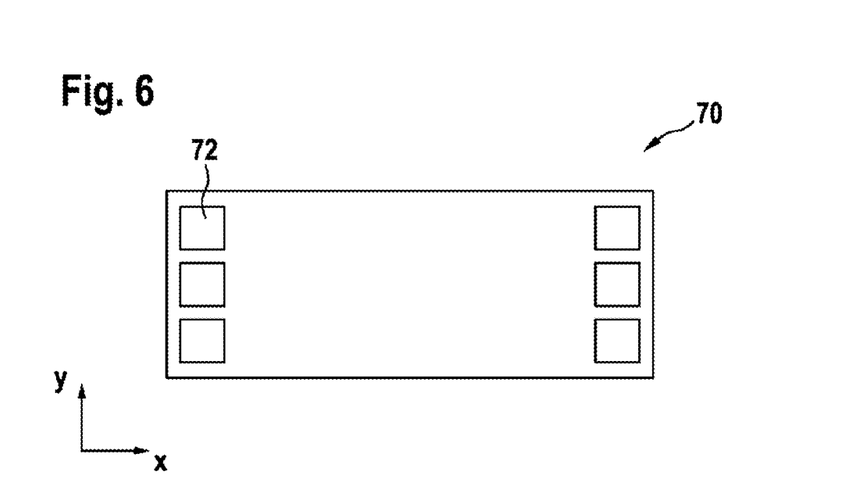
FIG. 6 shows a further exemplary embodiment of a module end plate in a schematic plan view.

FIG. 6 shows a plan view of a further module end plate 70. This module end plate 70 has closable port feedthroughs 72 so that the fluid flow can be interrupted as required, and is thus designed as a valve plate 70. Individual fuel cell modules 58 of the fuel cell stack 10 can therefore be selectively disconnected from the fluid supply (in particular from the supply of air and hydrogen). This can take place via a slide on the module end plate 70 or via suitable valve circuits to the individual fuel cell modules 58.

Figure 7:
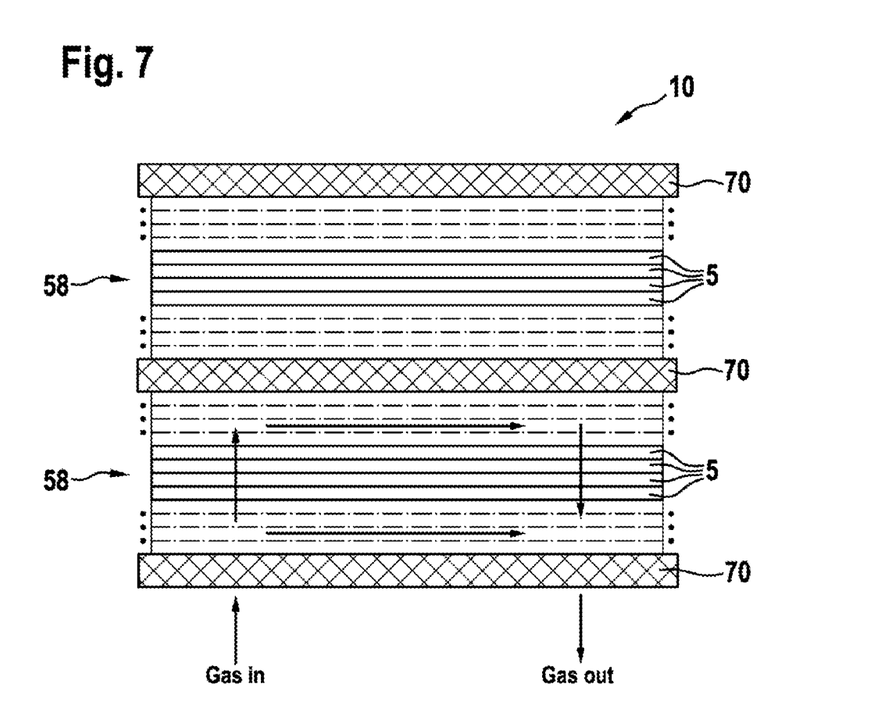
FIG. 7 shows a schematic illustration of a further fuel cell stack.

In this regard, FIG. 7 show a schematic illustration of a fuel cell stack 10 having two (optionally also several) fuel cell modules 58. The two fuel cell modules 58 are separated by a module end plate 70 designed as a valve plate. If the port feedthroughs 72 of the valve plate 70 are now closed, then—as illustrated by way of example for a gas—the gas flow only takes place in the lower fuel cell module 58; the upper fuel cell module 58 is disconnected from the gas supply.

Figure 8:
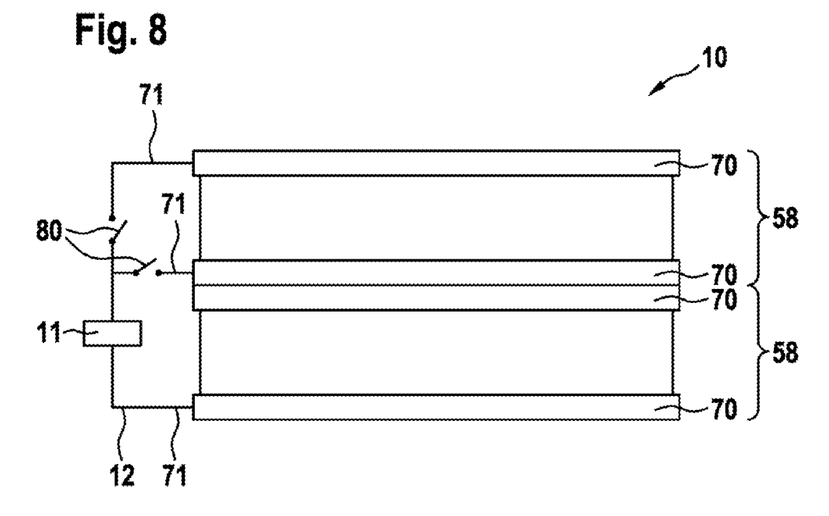
FIG. 8 shows a schematic illustration of another further fuel cell stack.

FIG. 8 shows a schematic illustration of a fuel cell stack 10, whereof the fuel cell modules 58 are each provided with an electrical switch 80. The fuel cell stack 10 has an electric circuit 12 with a consumer 11. The switches 80 are advantageously connected to the corresponding power connections 71 of the fuel cell modules 58. The consumer 11 can be a battery, for example.

At least one module end plate 70 preferably has closable port feedthroughs 72 so that the fluid supply into the corresponding or into the following fuel cell module 58 can be interrupted.

Conventionally, 10 up to 400 individual cells 5 are arranged on top of one another in a fuel cell stack 10. Depending on the load point of the consumer 11, an adapted volumetric flow of gases (air and hydrogen) typically flows over these individual cells 5, which, at low powers, results in very slow gas speeds in the active region of the individual cells 5. Since the full active surface of all 400 individual cells 5 is moreover always used, the specific current densities are very low, whereby very high cell voltages in the individual cells 5 can be reached, which accelerate cell aging and consequently shorten the lifespan of the fuel cell stack 10 as a whole. The main advantage of a load modulation with an inventive fuel cell stack 10 which combines the schematic embodiments of FIGS. 7 and 8 consists in that virtually optimal voltages are applied at the individual cells 5 both in a full-load range and in a low-load range.

Figure 9:
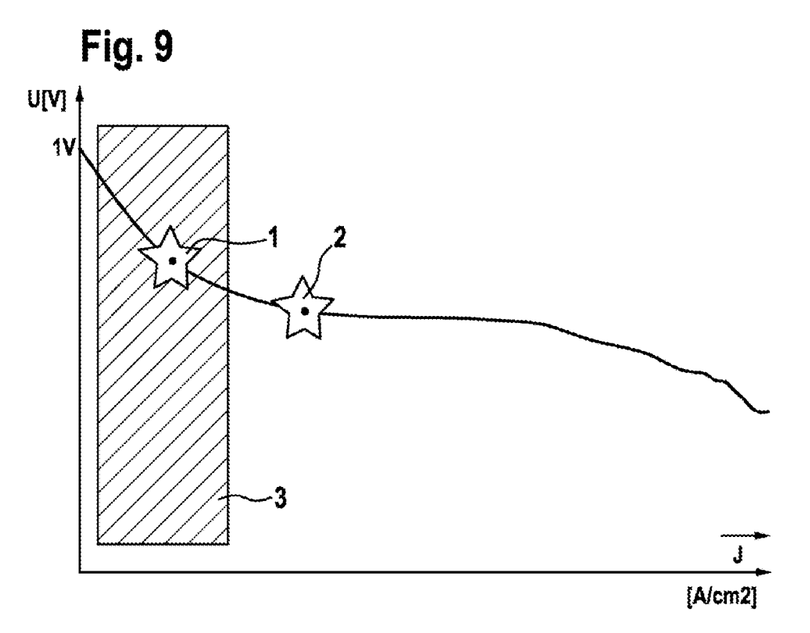
FIG. 9 shows a curve of an individual cell in an I-V graph.

By using only some of the fuel cell modules 58 for the low-load range (gas supply to only some of the fuel cell modules 58 by closing the closable port feedthroughs 72), the voltage at the individual cells 5 under load can be lowered from a critical first state 1 to a less harmful second state 2, see FIG. 9. To this end, in the illustration of FIG. 8, the lower switch 80 would be closed and the upper switch opened 80 so that only the lower fuel cell module 58 would be arranged in the electric circuit 12.

The critical zone 3 characterizes high voltages at the individual cell 5 with a low current density, which result in degradation of the individual cell 5. As a result of the effectively lower total active surface of the fuel cell stack 10, at low powers, the operating point on the I-V curve—as shown in FIG. 9—advantageously shifts to lower cell voltages, wherein the gas speed is increased, which has a positive effect on the mass-transport limitations.

For the full-load range, all fuel cell modules 58 are supplied with hydrogen and oxygen so that the electric power for the consumer 11 is increased. To this end, in the illustration of FIG. 8, the lower switch 80 would be opened and the upper switch closed 80 so that both fuel cell modules 58 would be arranged in the electric circuit 12.

The individual cells 5 are preferably also operated in the second state 2 in the full-load range. The fuel cell stack 10 is thus modulated with respect to the load point so that its entire active surface is adapted to the load point. To this end, the gas supply of the individual fuel cell modules 58 (see FIG. 7) is synchronized with the corresponding switching positions of the switches 80 (see FIG. 8).

The current collection from the respective fuel cell modules 58 is therefore controlled by switching the current. If a relatively low number of individual cells 5 are used, an additional DC/DC converter can be advantageously interconnected.

In advantageous embodiments, the individual cells 5 of different fuel cell modules 58 have a different design. In this case, the individual cells 5 can differ from fuel cell module 58 to fuel cell module 58, for example in terms of the gas diffusion layers 34, 38, the anode-side electrode, the cathode side electrode, the membrane 42 and/or the bipolar plates 18, 22. In this case, the individual cells 5 are particularly preferably configured differently in the anode-side electrode and in the cathode-side electrode.

For individual cells 5 of fuel cell modules 58 which are also supplied with gas or media for the low-load range, the following optimized features preferably apply:
  a comparatively high catalyst loading in the anode-side electrode and/or in the cathode-side electrode, which is adapted in particular to high (0.75-1V) and frequently changing potentials;
  the anode-side electrode and/or the cathode-side electrode and/or the gas diffusion layers 34, 38 are adapted to low and changing moisture levels;
  the membrane 42 and/or the gas diffusion layers 34, 38 have additional radical scavengers or a higher proportion of radical scavengers.

For individual cells 5 of fuel cell modules 58 which are disconnected from the gas or media supply for the low-load range, the following optimized features preferably apply, which are adapted to high loads:
  a comparatively low catalyst loading in the anode-side electrode and/or in the cathode-side electrode, which is adapted in particular to average, stable potentials (0.6-0.75V);
  the anode-side electrode and/or the cathode-side electrode and/or the gas diffusion layers 34, 38 are adapted to high moisture levels, advantageously also to liquid water, in particular on the cathode side.

What is claimed is:

1. A fuel cell stack (10) comprising:
at least two fuel cell modules (58) each having at least two individual cells (5) and each having module end plates (70) on both cell stack outer sides (66),
fuel cell stack compression means (82) via which the stacked fuel cell modules (58) are braced to form a fuel cell stack (10), and
module compression means (74) via which the individual cells (5) of each fuel cell module (58) are braced between the module end plates (70),
wherein the module compression means (74) are tensioning bands, and
wherein the tensioning bands (74) are electrically insulated only in a region of lateral contact surfaces of the individual cells (5).

2. The fuel cell stack (10) as claimed in claim 1, characterized in that each fuel cell module (58) has a power connection (71).

3. The fuel cell stack (10) as claimed in claim 1, characterized in that each fuel cell module (58) has a separate voltage control.

4. The fuel cell stack (10) as claimed in claim 1, characterized in that one or more module end plates (7) have a cooling distribution field (73).

5. The fuel cell stack (10) as claimed in claim 1, characterized in that one or more module end plates (70) have closable port feedthroughs (72).

6. The fuel cell stack (10) as claimed in claim 1, characterized in that individual fuel cell modules (58) are configured to be disconnected from an electric circuit (12) of the fuel cell stack (10) by electrical switches (80).

7. The fuel cell stack (10) as claimed in claim 6, characterized in that the individual cells (5) of the fuel cell modules (58) which are configured to be disconnected from the electric circuit (12) have a modified design.

8. The fuel cell stack (10) as claimed in claim 7, characterized in that the individual cells (5) of the fuel cell modules (58) which are configured to be disconnected from the electric circuit (12) have a comparatively low catalyst loading.

9. The fuel cell stack (10) as claimed in claim 1, characterized in that each fuel cell module (58) has a separate hydrogen sensor.

10. A method for producing a fuel cell stack (10) as claimed in claim 1, wherein the method comprises the following steps:
stacking at least two individual cells (5) of the fuel cell stack (10),
arranging module end plates (70) on both cell stack outer sides (66) of the stacked individual cells (5), bracing the individual cells (5) between the module end plates (70) by means of a module compression means (74) to form a fuel cell module (58), checking the fuel cell module (58) for absence of defects and/or for leak-tightness, stacking at least two fuel cell modules (58) produced in such a way, and bracing the stacked fuel cell modules (58) by means of a fuel cell stack compression means (82).

11. The method for producing a fuel cell stack (10) as claimed in claim 10, characterized in that the module compression means (74) are removed after the bracing of the stacked fuel modules (58).

12. The method for producing a fuel cell stack (10) as claimed in claim 10, characterized in that the individual cells (5) are conditioned prior to the stacking of the fuel cell modules (58).

13. A method for operating a fuel cell stack (10) as claimed in claim 1 in a low-load range, wherein individual fuel cell modules (58) can be disconnected from an electric circuit (12) of the fuel cell stack (10) by means of electrical switches (80), wherein the method comprises the following steps:

disconnecting a fuel cell module (58) from a gas supply;

disconnecting the same fuel cell module (58) from the electric circuit (12) by means of at least one switch (80).

14. A method for operating a fuel cell stack (10) as claimed in claim 1 in a low-load range, wherein one or more module end plates (70) have closable port feedthroughs (72), wherein individual fuel cell modules (58) can be disconnected from an electric circuit (12) of the fuel cell stack (10) by means of electrical switches (80), wherein the method comprises the following steps:

disconnecting a fuel cell module (58) from a gas supply by means of the closable port feedthroughs (72);

disconnecting the same fuel cell module (58) from the electric circuit (12) by means of at least one switch (80).

15. The fuel cell stack (10) as claimed in claim 1, characterized in that the module compression means (74) are tensioning bands, wherein each fuel cell module (58) has five to eight tensioning bands.

16. The fuel cell stack (10) as claimed in claim 1, characterized in that each fuel cell module (58) has a power connection (71), which is arranged on a module end plate (70).

* * * * *